UNITED STATES PATENT OFFICE.

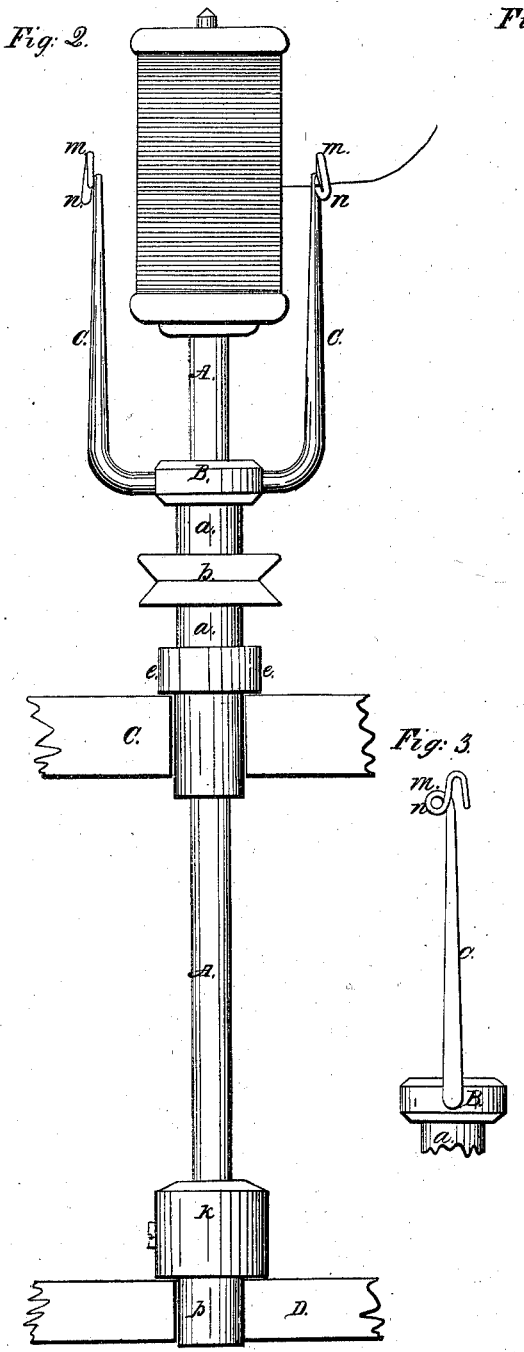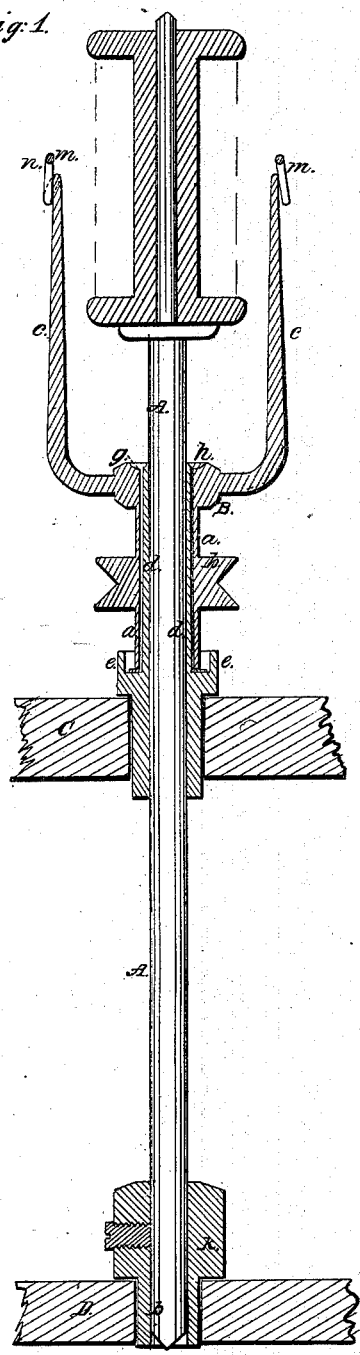

CYRIEL E. BROWN, OF MILLBURY, MASSACHUSETTS, ASSIGNOR TO HIMSELF, JOHN TENNY, AND JOHN RHODES, OF SAME PLACE.

SPINDLE AND FLIER.

Specification of Letters Patent No. 26,636, dated December 27, 1859.

*To all whom it may concern:*

Be it known that I, CYRIEL E. BROWN, of Millbury, in the county of Worcester and State of Massachusetts, have invented certain new and useful Improvements in Machinery for Spinning; and I do hereby declare the same to be fully described and represented in the following specification and the accompanying drawings, of which—

Figure 1, denotes a side elevation and Fig. 2, a longitudinal section of a flier and spindle furnished with my invention. Fig. 3, is a side view of the hook and eye of the flier arm.

My invention has reference to the spindle and flier of the ordinary throstle frame, the nature of such invention consisting in an arrangement of a secondary tubular bearing with the spindle and the tube for supporting the flier arms and whir; also in constructing the flier arm hook with a helical eye to open into it; also in making the top of the secondary bearing tube and that of the flier neck conical or otherwise so as to form a channel for receiving oil from the spindle and conducting it between the surfaces of the said tube and neck; in combining an oil receiver and bearing with the secondary bearing and so as to surround it, the spindle and the flier neck and constitute a bearing to the latter and at the same time serve to catch oil that may pass downward from between the rubbing surfaces of the secondary bearing tube and the flier neck.

In the drawings, A, represents the spindle, B, the flier, *a*, the neck of the flier, *b*, the whir, while *c*, *c*, are the arms of the flier: C and D, are the frame rails for supporting the flier and spindle. Heretofore, it has been customary to allow the flier to turn directly on the spindle. Instead of so doing I apply to the flier neck and spindle so as to insulate one from the other, a secondary bearing or tube *d*, *d*, which I step into or support by the rail C, as shown in Fig. 2, and this I construct with a shoulder in the form of a bearing and cup, as shown at *e*, such shoulder cup being made to support the lower end of the neck of the flier and to rise above and encompass the same. Furthermore, the upper end of the bearing *d*, and the flier neck, I form conical or beveled as shown at *g*, and *h*, so as to constitute a channel to receive oil from the spindle and convey the same between the rubbing surfaces of the bearing *d*, and the flier neck. Instead of supporting the drag of the spindle by extending the spindle through it, and stepping the said spindle in the rail D in the ordinary manner, I construct the said drag with a tubular extension or cylindrical bearing *l*, to extend into the said rail and receive the spindle. I also form the hook *m*, of each flier leg with a helical eye *n*, in manner and to open into the hook, as shown in Figs. 1, 2 and 3.

The advantage derived from the secondary bearing tube *d*, is that it prevents wear of the flier on the spindle or wear of the spindle on the flier, the wear being on the secondary tube. Consequently, the usual vibration incident to such wear of spindle and flier will be prevented, and the flier can be run at a much greater speed, and besides will last much longer than when the spindle revolves in contact with it.

The addition of the helical eye to the hook of the flier arm enables the draft on the bobbin to be regulated and the yarn to be guided to the bobbin to better advantage than by the hook alone, for while the eye serves to guide the arm correctly to the bobbin and prevents it from slipping off the hook it also allows the hook to receive two or more turns of the yarn so as to increase the draft on the bobbin. Besides the helical eye presents an advantage in applying the yarn to the arm and hook of the flier. By making the drag with a tubular bearing to extend into the spindle rail, the spindle is better supported and not liable to bind in the rail, and besides the holes for the spindle and the flier bearings can be reamed out to better advantage and truer than when the spindle alone extends into the rail.

The oil channel at the top of the flier neck and its bearing serves to catch the surplus oil which may run off the spindle, and to direct the same between the neck and the bearing. Furthermore, the bearing cup, at the bottom of the bearing and around the foot of the neck of the flier operates in conjunction with the bearing to receive the oil, which falls back or down after the flier may be stopped, such oil being taken up by the flier neck during its revolutions.

I claim—

1. The arrangement of the secondary or tubular stationary bearing, *d*, with the flier and spindle as specified.

2. Also, the combination of a helical eye with the flier arm and its hook and to open into the hook.

3. Also, making the top of the bearing $d$, and that of the flier neck, with an oil channel so arranged as not only to receive or catch the oil that runs off the spindle but direct or conduct it between the rubbing surfaces of the said neck and bearing.

4. I do not claim an oil cup as ordinarily applied to the foot of a spindle; nor as applied to a cop tube and spindle, as shown in the United States Patent No. 16298, but I claim combining or arranging an oil receiver and bearing, $e$, with the secondary bearing tube, $d$, and so as to surround it, the spindle and the flier neck substantially in manner and for the objects and purposes as specified.

CYRIEL E. BROWN.

Witnesses:
D. J. PAUL,
I. P. HALE, Jr.